United States Patent
Tripathi

(10) Patent No.: US 8,739,179 B2
(45) Date of Patent: May 27, 2014

(54) METHOD AND SYSTEM FOR LOW-OVERHEAD DATA TRANSFER

(75) Inventor: Sunay Tripathi, Palo Alto, CA (US)

(73) Assignee: Oracle America Inc., Redwood Shores, CA (US)

(*) Notice: Subject to any disclaimer, the term of this patent is extended or adjusted under 35 U.S.C. 154(b) by 1125 days.

(21) Appl. No.: 12/165,312

(22) Filed: Jun. 30, 2008

(65) Prior Publication Data

US 2009/0328073 A1 Dec. 31, 2009

(51) Int. Cl.
*G06F 3/00* (2006.01)
*G06F 9/44* (2006.01)
*G06F 9/46* (2006.01)
*G06F 13/00* (2006.01)

(52) U.S. Cl.
USPC .......................................... 719/313; 709/213

(58) Field of Classification Search
USPC .................. 719/312, 316; 709/213; 718/1
See application file for complete search history.

(56) References Cited

U.S. PATENT DOCUMENTS

| | | | |
|---|---|---|---|
| 6,041,053 A | 3/2000 | Douceur et al. | |
| 6,070,219 A | 5/2000 | McAlpine et al. | |
| 6,131,163 A | 10/2000 | Wiegel | |
| 6,163,539 A | 12/2000 | Alexander et al. | |
| 6,269,401 B1 | 7/2001 | Fletcher et al. | |
| 6,477,643 B1 | 11/2002 | Vorbach et al. | |
| 6,594,775 B1 | 7/2003 | Fair | |
| 6,600,721 B2 | 7/2003 | Edholm | |
| 6,697,878 B1 * | 2/2004 | Imai | 719/316 |
| 6,714,960 B1 | 3/2004 | Bitar et al. | |
| 6,757,731 B1 | 6/2004 | Barnes et al. | |
| 6,771,595 B1 | 8/2004 | Gilbert et al. | |
| 6,831,893 B1 | 12/2004 | Ben Nun et al. | |
| 6,859,841 B2 | 2/2005 | Narad et al. | |
| 6,944,168 B2 | 9/2005 | Paatela et al. | |
| 6,985,937 B1 | 1/2006 | Keshav et al. | |
| 7,046,665 B1 | 5/2006 | Walrand et al. | |
| 7,111,303 B2 | 9/2006 | Macchiano et al. | |
| 7,146,431 B2 | 12/2006 | Hipp et al. | |

(Continued)

FOREIGN PATENT DOCUMENTS

| | | |
|---|---|---|
| CN | 1893437 A | 1/2007 |
| CN | 101162971 A | 4/2008 |
| WO | 2005057318 A2 | 6/2005 |
| WO | 2008093174 A1 | 8/2008 |

OTHER PUBLICATIONS

Ansari et al, Implementing Cisco InfiniBand on IBM BladeCenter, IBM, Oct. 2007, 174 pages.*

(Continued)

*Primary Examiner* — Diem Cao
(74) *Attorney, Agent, or Firm* — Osha Liang LLP

(57) ABSTRACT

A method for low-overhead data transfer. The method includes initiating, by a first application, TCP connection with a second application, establishing, in response to the initiation, the TCP connection between the first application and the second application, providing, by the first application, pre-post buffer information to the second application, where the pre-post buffer information corresponds to a location in a physical memory of the first computer and where the location in physical memory corresponds to a virtual memory address of the first application. The method further comprising transferring data, by the second application, to the first application using the pre-post buffer information, where transferring the data comprises writing the data directly into a location in the physical memory of the first computer.

19 Claims, 9 Drawing Sheets

(56) References Cited

U.S. PATENT DOCUMENTS

| | | | |
|---|---|---|---|
| 7,177,311 | B1 | 2/2007 | Hussain et al. |
| 7,200,704 | B2 | 4/2007 | Njoku et al. |
| 7,213,098 | B2* | 5/2007 | Czajkowski ............ 711/2 |
| 7,260,102 | B2 | 8/2007 | Mehrvar et al. |
| 7,313,142 | B2 | 12/2007 | Matsuo et al. |
| 7,450,498 | B2 | 11/2008 | Golia et al. |
| 7,502,884 | B1 | 3/2009 | Shah et al. |
| 7,561,531 | B2 | 7/2009 | Lewites et al. |
| 7,620,955 | B1 | 11/2009 | Nelson |
| 7,633,955 | B1 | 12/2009 | Saraiya et al. |
| 7,688,838 | B1 | 3/2010 | Aloni et al. |
| 7,694,298 | B2* | 4/2010 | Goud et al. ............ 718/1 |
| 7,730,486 | B2 | 6/2010 | Herington |
| 2002/0052972 | A1 | 5/2002 | Yim |
| 2002/0080721 | A1 | 6/2002 | Tobagi et al. |
| 2003/0037154 | A1 | 2/2003 | Poggio et al. |
| 2003/0120772 | A1 | 6/2003 | Husain et al. |
| 2004/0015966 | A1 | 1/2004 | MacChiano et al. |
| 2004/0170127 | A1 | 9/2004 | Tanaka |
| 2004/0199808 | A1 | 10/2004 | Freimuth et al. |
| 2004/0202182 | A1 | 10/2004 | Lund et al. |
| 2004/0210623 | A1 | 10/2004 | Hydrie et al. |
| 2004/0267866 | A1 | 12/2004 | Carollo et al. |
| 2005/0111455 | A1 | 5/2005 | Nozue et al. |
| 2005/0135243 | A1 | 6/2005 | Lee et al. |
| 2005/0138620 | A1 | 6/2005 | Lewites |
| 2005/0182853 | A1 | 8/2005 | Lewites et al. |
| 2005/0251802 | A1 | 11/2005 | Bozek et al. |
| 2006/0041667 | A1 | 2/2006 | Ahn et al. |
| 2006/0045089 | A1 | 3/2006 | Bacher et al. |
| 2006/0070066 | A1 | 3/2006 | Grobman |
| 2006/0092928 | A1 | 5/2006 | Pike et al. |
| 2006/0174324 | A1 | 8/2006 | Zur et al. |
| 2006/0206300 | A1 | 9/2006 | Garg et al. |
| 2006/0206602 | A1 | 9/2006 | Hunter et al. |
| 2006/0233168 | A1 | 10/2006 | Lewites et al. |
| 2006/0236063 | A1 | 10/2006 | Hausauer et al. |
| 2006/0253619 | A1 | 11/2006 | Torudbakken et al. |
| 2007/0047536 | A1 | 3/2007 | Scherer et al. |
| 2007/0078988 | A1 | 4/2007 | Miloushev et al. |
| 2007/0083723 | A1 | 4/2007 | Dey et al. |
| 2007/0101323 | A1 | 5/2007 | Foley et al. |
| 2007/0162619 | A1* | 7/2007 | Aloni et al. ............ 709/250 |
| 2007/0244937 | A1 | 10/2007 | Flynn et al. |
| 2007/0244972 | A1 | 10/2007 | Fan |
| 2008/0002683 | A1 | 1/2008 | Droux et al. |
| 2008/0005748 | A1 | 1/2008 | Mathew et al. |
| 2008/0019365 | A1 | 1/2008 | Tripathi et al. |
| 2008/0022016 | A1 | 1/2008 | Tripathi et al. |
| 2008/0043765 | A1 | 2/2008 | Belgaied et al. |
| 2008/0059644 | A1* | 3/2008 | Bakke et al. ............ 709/230 |
| 2008/0082685 | A1* | 4/2008 | Dabagh et al. ............ 709/238 |
| 2008/0082696 | A1* | 4/2008 | Bestler ............ 709/250 |
| 2008/0144635 | A1 | 6/2008 | Carollo et al. |
| 2008/0171550 | A1 | 7/2008 | Zhao |
| 2008/0192648 | A1 | 8/2008 | Galles |
| 2008/0225875 | A1 | 9/2008 | Wray et al. |
| 2008/0239945 | A1 | 10/2008 | Gregg |
| 2008/0253379 | A1 | 10/2008 | Sasagawa |
| 2008/0270599 | A1 | 10/2008 | Tamir et al. |
| 2009/0006593 | A1 | 1/2009 | Cortes |
| 2009/0125752 | A1 | 5/2009 | Chan et al. |
| 2010/0046531 | A1 | 2/2010 | Louati et al. |
| 2011/0191436 | A1* | 8/2011 | Aloni et al. ............ 709/213 |

OTHER PUBLICATIONS

Chochia, IBM High Performance Computing for AIX Using InfiniBand, Oct. 2007, pp. 1-19.*

Samaan, The Benefits of Blade Servers and Virtualization, Information Technology at NYU, 2006, 2 pages.*

Goldenberg, D. et al.; "Zero Copy Sockets Direct Protocol over InfiniBand—Preliminary Implementation and Performance Analysis"; Proceedings of the 13th Symposium on High Performance Interconnects; Piscataway, NJ; Aug. 17-19, 2005, pp. 128-137 (10 pages).

"I/O Virtualization Using Mellanox InfiniBand and Channel I/O Virtualization (CIOV) Technology"; XP-002541674; 2007; Retrieved from the Internet: <http://www.mellanox.com/pdf/whitepapers/WP_Virtualize_with_IB.pdf>; pp. 1-16 (16 pages).

"InfiniBand Software and Protocols Enable Seamless Off-the-shelf Applications Deployment"; XP-002541743; Dec. 2007; Retrieved from the Internet: <http://www.mellanox.com/pdf/whitepapers/WP_2007_IB_Sofware_and_Protocols.pdf>; pp. 1-8 (8 pages).

"InfiniBand Software Stack"; XP-002541744; Jan. 1, 2006; Retrieved from the Internet: <http://download.microsoft.com/download/c/3/1/c318044c-95e8-4df9-a6af-81cdcb3c53c5/Mellanox%20Technologies%20-%20Infiniband%20Software%20Stack%20-%20WinIB%20-%20external.PDF>, pp. 1-2 (2 pages).

Wheeler, B.; "10 Gigabit Ethernet in Servers; Benefits and Challenges"; XP-002541745; Jan. 2005; Retrieved from the Internet: <http://www.hp.com/products1/serverconnectivity/adapters/ethernet/10gbe/infolibrary/10GbE_White_Paper.pdf> (8 pages).

"Windows Platform Design Notes: Winsock Direct and Protocol Offload on SANs"; XP-002541746; Mar. 3, 2001; Retrieved from the Internet: <http://download.microsoft.com/download/1/6/1/161ba512-40e2-4cc9-843a-923143f3456c/WinsockDirect-ProtocolOffload.doc> (8 pages).

International Search Report from PCT/US2009/048594 dated Sep. 7, 2009 (5 pages).

Written Opinion from PCT/US2009/048594 dated Sep. 7, 2009 (7 pages).

Dovrolis, C., Thayer, B. and Ramanathan, P.: "HIP: Hybrid Interrupt—Polling for the Network Interface", ACM SIGOPS Operating Systems Review, vol. 35, Iss. 4, Oct. 2001, (11 Pages).

Tripathi, S.; "Solaris Networking—The Magic Revealed (Part 1)"; Sunay Tripathi's Solaris Networking Weblog; Nov. 14, 2005, pp. 1-22 (22 pages).

Tripathi, S.; "CrossBow: Solaris Network Virtualization and Resource Control", Crossbow Architectual Document, Nov. 21, 2006; 19 pages.

Nordmark, E. et al. ; "IP Instances Interface Document"; PSARC 2006/366, Dec. 28, 2006; 17 pages.

Nordmark, E.; "IP Instances Design Document"; PSARC 2006/366, Dec. 21, 2006; 38 pages.

Tripathi, S., "CrossBow: Solaris Network Virtualization & Resource Control"; CrossBow Overview Document, Aug. 23, 2006; 12 pages.

Nordmark, E.; "IP Instances—Network Isolation Meets Zones"; presented at the SVOSUG meeting, Oct. 26, 2006; 28 pages.

Tripathi, S.; "CrossBow: Network Virtualization and Resource Control"; presented at the SVOSUG meeting, Aug. 24, 2006; 28 pages.

Tripathi, S.; "Crossbow: ReCap"; presented at an internal Sun Labs Open House presentation on Jun. 1, 2006, made public Aug. 2006; 23 pages.

Popuri, S., OpenSolaris Virtualization Technologies, Feb. 23, 2007, Retrieved from the Internet,<hub.opensolaris.org/bin/view/Community+Group+advocacy/techdays%2Darchive%2D06%2D07>, 42 pages.

International Search Report dated Aug. 19, 2009 (3 pages).

International Preliminary Report on Patentability issued in PCT/US2009/035405, Dated Sep. 10, 2010, (9 Pages).

Kumar, R., ASI and PGI Express: Complementary Solutions, Dec. 1, 2004, RTC Magazine, Retrieved from the Internet <rtcmagazine.com/articles/view/100274>, (5 pages).

Martinez, R., Alfaro, F.J., and Sanchez, J.L., Providing Quality of Service Over Advanced Switching, Jan. 1, 2006, IEEE, Retrieved from the Internet, <ieeexplore.ieee.org/xpls/abs_all.jsp?arnumber=1655667&tag=1>, 10 pages.

Apani, Brave New World, Feb. 1, 2007, iSmile, Retrieved from the Internet, <isimile.com/PDFs/Apani_Segmentation_WP.pdf>, 8 pages.

Trapeze, Trapeze Overview, Jan. 1, 1998, USENIX, Retrieved from the Internet, <usenix.org/publications/library/proceedings/usenix98/full_papers/anderson_html/node4.html>, 2 pages.

Office Action in United States Patent and Trademark Office for U.S. Appl. No. 11/953,829, Mailed Aug. 4, 2010 (30 Pages).

Office Action in United States Patent and Trademark Office for U.S. Appl. No. 11/953,837, Mailed Jun. 11, 2010 (27 Pages).

(56) References Cited

OTHER PUBLICATIONS

Office Action in United States Patent and Trademark Office for U.S. Appl. No. 11/953,839, Mailed Aug. 19, 2010 (30 Pages).
Office Action in United States Patent and Trademark Office for U.S. Appl. No. 12/040,165, Mailed Feb. 8, 2010 (40 Pages).
Notice of Allowance in United States Patent and Trademark Office for U.S. Appl. No. 12/040,165, Mailed Oct. 29, 2010 (18 Pages).
Office Action in United States Patent and Trademark Office for U.S. Appl. No. 12/040,101, Mailed May 6, 2010 (39 Pages).
Office Action in United States Patent and Trademark Office for U.S. Appl. No. 11/953,842, Mailed Apr. 30, 2010 (39 Pages).
Final Office Action in United States Patent and Trademark Office for U.S. Appl. No. 11/953,842, Mailed Oct. 15, 2010 (32 Pages).
Office Action in United States Patent and Trademark Office for U.S. Appl. No. 12/040,105, Mailed Nov. 20, 2009 (93 Pages).
Final Office Action in United States Patent and Trademark Office for U.S. Appl. No. 12/040,105, Mailed Oct. 5, 2010 (27 Pages).
Notice of Allowance in United States Patent and Trademark Office for U.S. Appl. No. 12/040,105, Mailed Oct. 5, 2010 (27 Pages).
Office Action in United State Patent and Trademark Office for U.S. Appl. No. 11/953,843, Mailed May 3, 2010 (169 Pages).
Final Office Action in United States Patent and Trademark Office for U.S. Appl. No. 11/953,843, Mailed Oct. 15, 2010 (33 Pages).
Office Action in United States Patent and Trademark Office for U.S. Appl. No. 12/053,666, Mailed Dec. 10, 2009 (36 Pages).
Final Office Action in United States Patent and Trademark Office for U.S. Appl. No. 12/053,666, Mailed Jun. 11, 2010 (27 Pages).
Notice of Allowance in United States Patent and Trademark Office for U.S. Appl. No. 12/053,666, Mailed Oct. 7, 2010 (15 Pages).
Office Action in United States Patent and Trademark Office for U.S. Appl. No. 12/053,676, Mailed Dec. 9, 2009 (41 Pages).
Notice of Allowance in United States Patent and Trademark Office for U.S. Appl. No. 12/053,676, Mailed Jul. 15, 2010 (20 Pages).
Office Action in United States Patent and Trademark Office for U.S. Appl. No. 11/953,843, Mailed May 3, 2010 (169 pages).
Final Office Action in United States Patent and Trademark Office for U.S. Appl. No. 12/040,101, Mailed Dec. 13, 2010 (25 pages).
Office Action issued in Application No. 200980131451.6 dated Sep. 24, 2012 (11 pages).

* cited by examiner

METHOD AND SYSTEM FOR LOW-OVERHEAD DATA TRANSFER

The present application contains subject matter that may be related to the subject matter in the following U.S. application filed on Dec. 10, 2007, and assigned to the assignee of the present application: "Method and System for Enforcing Resource Constraints for Virtual Machines across Migration" with U.S. application Ser. No. 11/953,839 .

BACKGROUND

Conventionally, in the computer-related arts, a network is an arrangement of physical computer systems configured to communicate with each other. In some cases, the physical computer systems include virtual machines, which may also be configured to interact with the network (i.e., communicate with other physical computers and/or virtual machines in the network). Many different types of networks exist, and a network may be classified based on various aspects of the network, such as scale, connection method, functional relationship of computer systems in the network, and/or network topology.

Regarding connection methods, a network may be broadly categorized as wired (using a tangible connection medium such as Ethernet cables) or wireless (using an intangible connection medium such as radio waves). Different connection methods may also be combined in a single network. For example, a wired network may be extended to allow devices to connect to the network wirelessly. However, core network components such as routers, switches, and servers are generally connected using physical wires. Ethernet is defined within the Institute of Electrical and Electronics Engineers (IEEE) 802.3 standards, which are supervised by the IEEE 802.3 Working Group.

To create a wired network, computer systems must be physically connected to each other. That is, the ends of physical wires (for example, Ethernet cables) must be physically connected to network interface cards in the computer systems forming the network. To reconfigure the network (for example, to replace a server or change the network topology), one or more of the physical wires must be disconnected from a computer system and connected to a different computer system.

Further, when transferring data between computer systems in a network, one or more network protocols are typically used to help ensure the data are transferred successfully. For example, network protocols may use checksums, small data packets, acknowledgments, and other data integrity features to help avoid data loss or corruption during the data transfer. The amount of data integrity features required in the network protocol(s) generally depends on the type of data being transferred and the quality of the connection(s) between the computer systems.

SUMMARY

In general, in one aspect, the invention relates to a method for low-overhead data transfer. The method includes initiating, by a first application, a Transmission Communication Protocol (TCP) connection with a second application, wherein the first application is executing on a first computer in a first virtual machine, the second application is executing on a second computer in a second virtual machine, and the first computer and the second computer are located on a chassis and communicate over a chassis interconnect, establishing, in response to the initiation, the TCP connection between the first application and the second application, determining that the first computer and second computer are located on the chassis, providing, by the first application, pre-post buffer information to the second application, wherein the pre-post buffer information corresponds to a location in a physical memory of the first computer and wherein the location in physical memory corresponds to a virtual memory address of the first application, and transferring data, by the second application, to the first application using the pre-post buffer information, wherein transferring the data comprises writing the data directly into the location in the physical memory of the first computer.

In general, in one aspect, the invention relates to a system. The system includes a chassis interconnect and a first application is executing on a first computer in a first virtual machine and a second application is executing on a second computer in a second virtual machine, wherein the first computer and the second computer are located on a chassis and communicate over the chassis interconnect, wherein the first application is configured to initiate a Transmission Communication Protocol (TCP) connection with the second application, wherein, in response to the initiation, the TCP connection is established between the first application and the second application, wherein the first application is configured to provide pre-post buffer information to the second application after the first application is determined to be executing on the same chassis as the second application, wherein the pre-post buffer information corresponds to a location in a physical memory of the first computer and wherein the location in physical memory corresponds to a virtual memory address of the first application, and wherein the second application transfers data to the first application using the pre-post buffer information, wherein transferring the data comprises writing the data directly into the location in the physical memory of the first computer.

In general, in one aspect, the invention relates to a computer readable medium comprising a plurality of executable instructions for low-overhead data transfer, wherein the plurality of executable instructions comprises instructions to initiate, by a first application, a Transmission Communication Protocol (TCP) connection with a second application, wherein the first application is executing on a first computer in a first virtual machine, the second application is executing on a second computer in a second virtual machine, and the first computer and the second computer are located on a chassis and communicate over a chassis interconnect, establish, in response to the initiation, the TCP connection between the first application and the second application, determine that the first computer and second computer are located on the chassis, provide, by the first application, pre-post buffer information to the second application, wherein the pre-post buffer information corresponds to a location in a physical memory of the first computer and wherein the location in physical memory corresponds to a virtual memory address of the first application, and transfer data, by the second application, to the first application using the pre-post buffer information, wherein transferring the data comprises writing the data directly into the location in the physical memory of the first computer.

Other aspects of the invention will be apparent from the following description and the appended claims.

DETAILED DESCRIPTION

Figure 1:
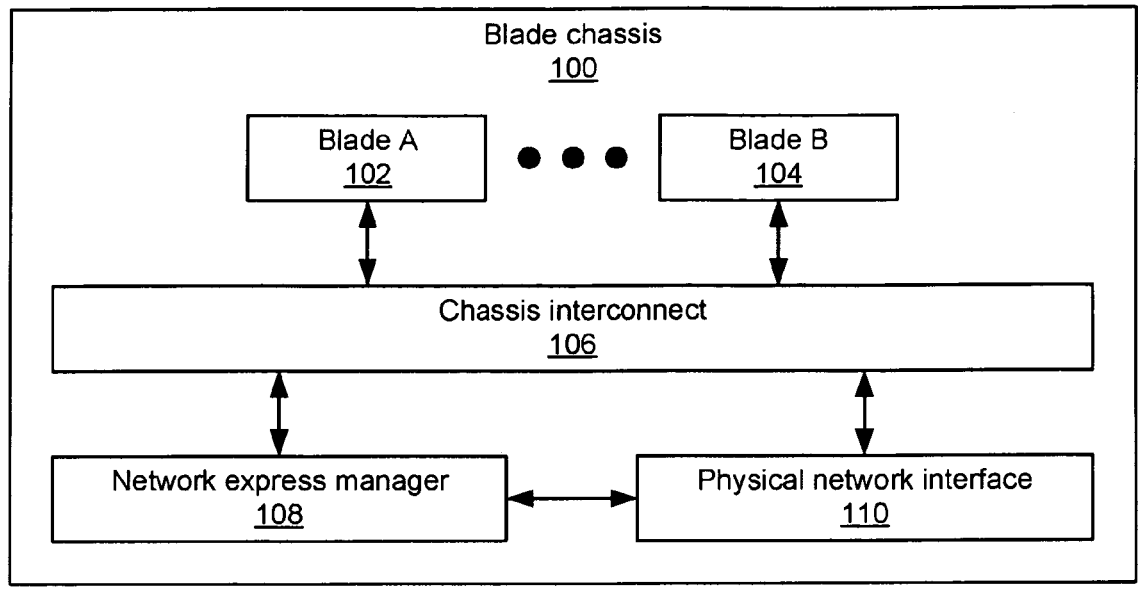
FIG. 1 shows a diagram of a blade chassis in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details.

In other instances, well-known features have not been described in detail to avoid unnecessarily complicating the description.

In general, embodiments of the invention provide a method and system for low-overhead data transfer. More specifically, embodiments of the invention provide a method and system for enabling two applications executing on blades within a common blade chassis to communicate using low-overhead data transfer.

Further, embodiments of the invention provide a method and system to enable two applications to participate in a zero-copy handshake and then proceed to communicate using low-overhead data transfer.

In one or more embodiments of the invention, the VNICs are connected to each other via a chassis interconnect. Specifically, the VNICs may be nodes of a virtual network path that includes a "virtual wire" used to transmit network traffic via the chassis interconnect. The concept of a virtual wire is discussed in detail below.

FIG. 1 shows a diagram of a blade chassis (100) in accordance with one or more embodiments of the invention. The blade chassis (100) includes multiple blades (e.g., blade A (102), blade B (104)) communicatively coupled with a chassis interconnect (106). For example, the blade chassis (100) may be a Sun Blade 6048 Chassis by Sun Microsystems Inc., an IBM BladeCenter® chassis, an HP BladeSystem enclosure by Hewlett Packard Inc., or any other type of blade chassis. The blades may be of any type(s) compatible with the blade chassis (100). BladeCenter® is a registered trademark of International Business Machines, Inc. (IBM), headquartered in Armonk, N.Y.

In one or more embodiments of the invention, the blades are configured to communicate with each other via the chassis interconnect (106). Thus, the blade chassis (100) allows for communication between the blades without requiring traditional network wires (such as Ethernet cables) between the blades. For example, depending on the type of blade chassis (100), the chassis interconnect (106) may be a Peripheral Component Interface Express (PCI-E) backplane, and the blades may be configured to communicate with each other via PCI-E endpoints. Those skilled in the art will appreciate that other connection technologies may be used to connect the blades to the blade chassis.

Continuing with the discussion of FIG. 1, to communicate with clients outside the blade chassis (100), the blades are configured to share a physical network interface (110). The physical network interface (110) includes one or more network ports (for example, Ethernet ports), and provides an interface between the blade chassis (100) and the network (i.e., interconnected computer systems external to the blade chassis (100)) to which the blade chassis (100) is connected. The blade chassis (100) may be connected to multiple networks, for example using multiple network ports.

In one or more embodiments, the physical network interface (110) is managed by a network express manager (108). Specifically, the network express manager (108) is configured to manage access by the blades to the physical network interface (110). The network express manager (108) may also be configured to manage internal communications between the blades themselves, in a manner discussed in detail below. The network express manager (108) may be any combination of hardware, software, and/or firmware including executable logic for managing network traffic.

Figure 2:
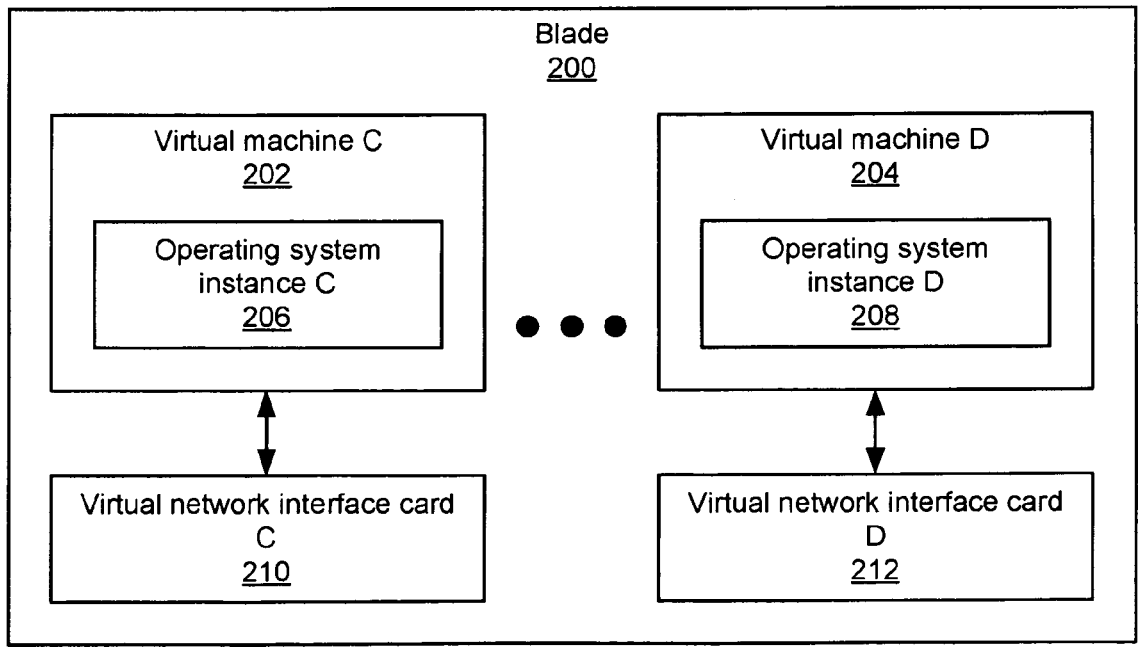
FIG. 2 shows a diagram of a blade in accordance with one or more embodiments of the invention.

FIG. 2 shows a diagram of a blade (200) in accordance with one or more embodiments of the invention. "Blade" is a term of art referring to a computer system located within a blade chassis (for example, the blade chassis (100) of FIG. 1). Blades typically include fewer components than stand-alone computer systems or conventional servers. In one or more embodiments of the invention, fully featured stand-alone computer systems or conventional servers may also be used instead of (or in combination with) the blades. Generally, blades in a blade chassis each include one or more processors and associated memory (e.g., RAM, ROM, etc.). Blades may also include storage devices (for example, hard drives and/or optical drives) and numerous other elements and functionalities typical of today's computer systems (not shown), such as a keyboard, a mouse, and/or output means such as a monitor. One or more of the aforementioned components may be shared by multiple blades located in the blade chassis. For example, multiple blades may share a single output device.

Continuing with discussion of FIG. 2, the blade (200) includes a host operating system (not shown) configured to execute one or more virtual machines (e.g., virtual machine C (202), virtual machine D (204)). Broadly speaking, the virtual machines are distinct operating environments configured to inherit underlying functionality of the host operating system via an abstraction layer. In one or more embodiments of the invention, each virtual machine includes a separate instance of an operating system (e.g., operating system instance C (206), operating system instance D (208)). For example, the Xen® virtualization project allows for multiple guest operating systems executing in a host operating system. Xen® is a trademark overseen by the Xen Project Advisory Board. In one or more embodiments of the invention, the host operating system supports virtual execution environments (not shown). An example of virtual execution environment is a Solaris™ Container. In such cases, the Solaris™ Container may execute in the host operating system, which may be a Solaris™ operating system. Solaris™ is a trademark of Sun Microsystems, Inc. In one or more embodiments of the invention, the host operating system may include both virtual machines and virtual execution environments.

Many different types of virtual machines and virtual execution environment exist. Further, the virtual machines may include many different types of functionality, such as a switch, a router, a firewall, a load balancer, an application server, any other type of network-enabled service, or any combination thereof.

In one or more embodiments of the invention, the virtual machines and/or virtual execution environments inherit network connectivity from the host operating system via VNICs (e.g., VNIC C (210), VNIC D (212)). To the virtual machines and the virtual execution environments, the VNICs appear as physical NICs. In one or more embodiments of the invention, the use of VNICs allows an arbitrary number of virtual machines and/or virtual execution environments to share the blade's (200) networking functionality. Further, in one or more embodiments of the invention, each virtual machine and/or virtual execution environment may be associated with an arbitrary number of VNICs, thereby providing increased flexibility in the types of networking functionality available to the virtual machines and/or virtual execution environments. For example, a virtual machine may use one VNIC for incoming network traffic, and another VNIC for outgoing network traffic.

VNICs in accordance with one or more embodiments of the invention are described in detail in commonly owned U.S. patent application Ser. No. 11/489,942, entitled "Multiple Virtual Network Stack Instances using Virtual Network Interface Cards," in the names of Nicolas G. Droux, Erik Nordmark, and Sunay Tripathi, the contents of which are hereby incorporated by reference in their entirety. VNICs in accordance with one or more embodiments of the invention also are described in detail in commonly owned U.S. patent application Ser. No. 11/480,000, entitled "Method and System for Controlling Virtual Machine Bandwidth" in the names of Sunay Tripathi, Tim P. Marsland, and Nicolas G. Droux the contents of which are hereby incorporated by reference in their entirety.

Figure 3:
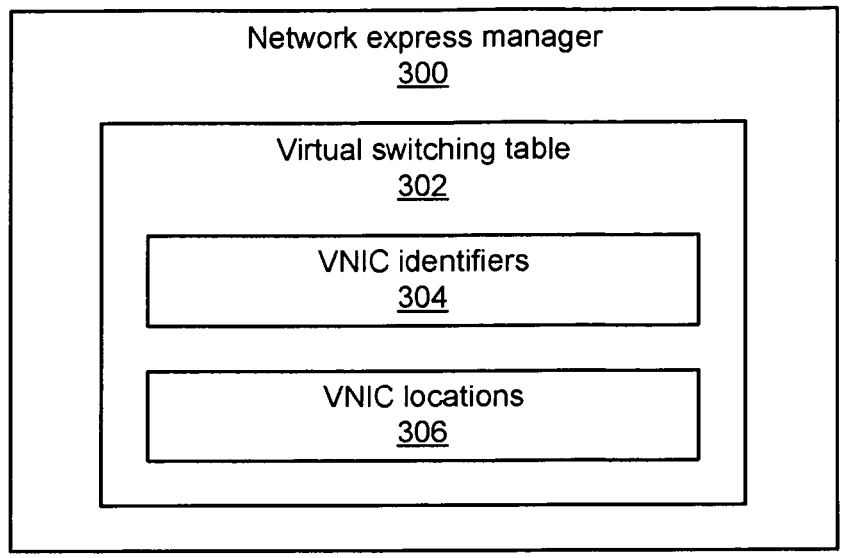
FIG. 3 shows a diagram of a network express manager in accordance with one or more embodiments of the invention.

As discussed above, each blade's networking functionality (and, by extension, networking functionality inherited by the VNICs) includes access to a shared physical network interface and communication with other blades via the chassis interconnect. FIG. 3 shows a diagram of a network express manager (300) in accordance with one or more embodiments of the invention. The network express manager (300) is configured to route network traffic traveling to and from VNICs located in the blades. Specifically, the network express manager (300) includes a virtual switching table (302), which includes a mapping of VNIC identifiers (304) to VNIC locations (306) in the chassis interconnect. In one or more embodiments, the VNIC identifiers (304) are Internet Protocol (IP) addresses, and the VNIC locations (306) are PCI-E endpoints associated with the blades (e.g., if the chassis interconnect is a PCI-E backplane). Alternatively, another routing scheme may be used.

In one or more embodiments, the network express manager (300) is configured to receive network traffic via the physical network interface and route the network traffic to the appropriate location (i.e., where the VNIC is located) using the virtual switching table (302). Further, the network express manager (300) may be configured to route network traffic between different VNICs located in the blade chassis. In one or more embodiments of the invention, using the virtual switching table (302) in this manner facilitates the creation of a virtual network path, which includes virtual wires. Thus, using the virtual switching table (302), virtual machines located in different blades may be interconnected to form an arbitrary virtual network topology, where the VNICs associated with each virtual machine do not need to know the physical locations of other VNICs. Further, if a virtual machine is migrated from one blade to another, the virtual network topology may be preserved by updating the virtual switching table (302) to reflect the corresponding VNIC's new physical location (for example, a different PCI-E endpoint).

In some cases, network traffic from one VNIC may be destined for a VNIC located in the same blade, but associated with a different virtual machine. In one or more embodiments of the invention, a virtual switch may be used to route the network traffic between the VNICs independent of the blade chassis. Virtual switches in accordance with one or more embodiments of the invention are discussed in detail in commonly owned U.S. patent application Ser. No. 11/480,261, entitled "Virtual Switch," in the names of Nicolas G. Droux, Sunay Tripathi, and Erik Nordmark, the contents of which are hereby incorporated by reference in their entirety.

Figure 4:
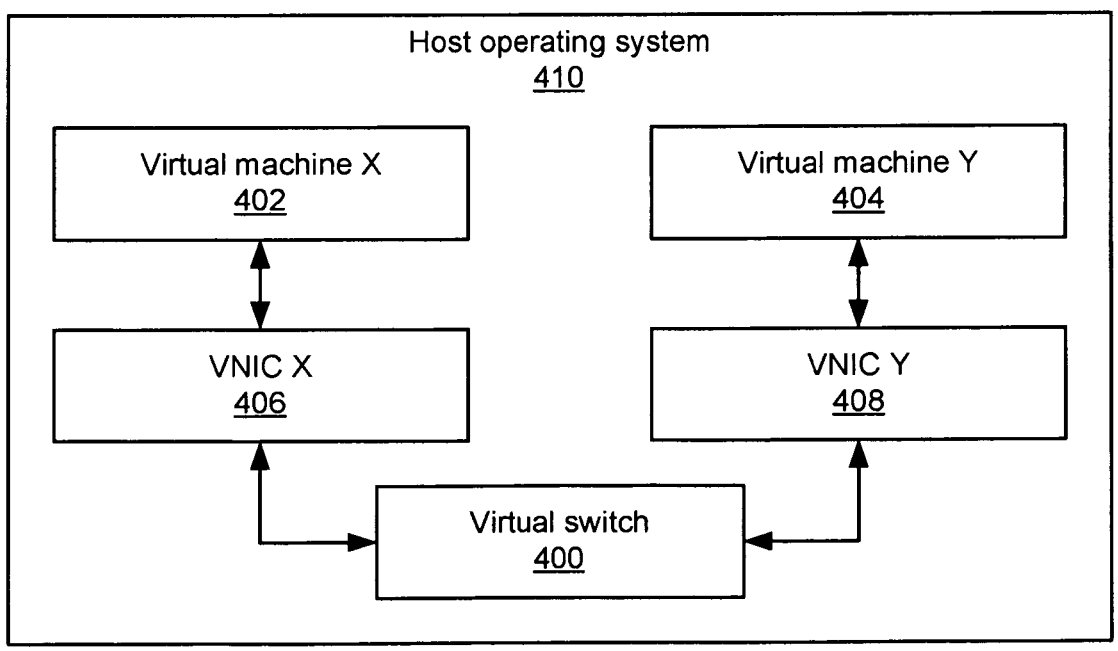
FIG. 4 shows a diagram of a virtual machine in accordance with one or more embodiments of the invention.

For example, FIG. 4 shows a diagram of a virtual switch (400) in accordance with one or more embodiments of the invention. The virtual switch (400) provides connectivity between VNIC X (406) associated with virtual machine X (402) and VNIC Y (408) associated with virtual machine Y (404). In one or more embodiments, the virtual switch (400) is managed by a host operating system (410) within which virtual machine X (402) and virtual machine Y (404) are located. Specifically, the host operating system (410) may be configured to identify network traffic targeted at a VNIC in the same blade, and route the traffic to the VNIC using the virtual switch (400). In one or more embodiments of the invention, the virtual switch (400) may reduce utilization of the blade chassis and the network express manager by avoiding unnecessary round-trip network traffic.

Figure 5:
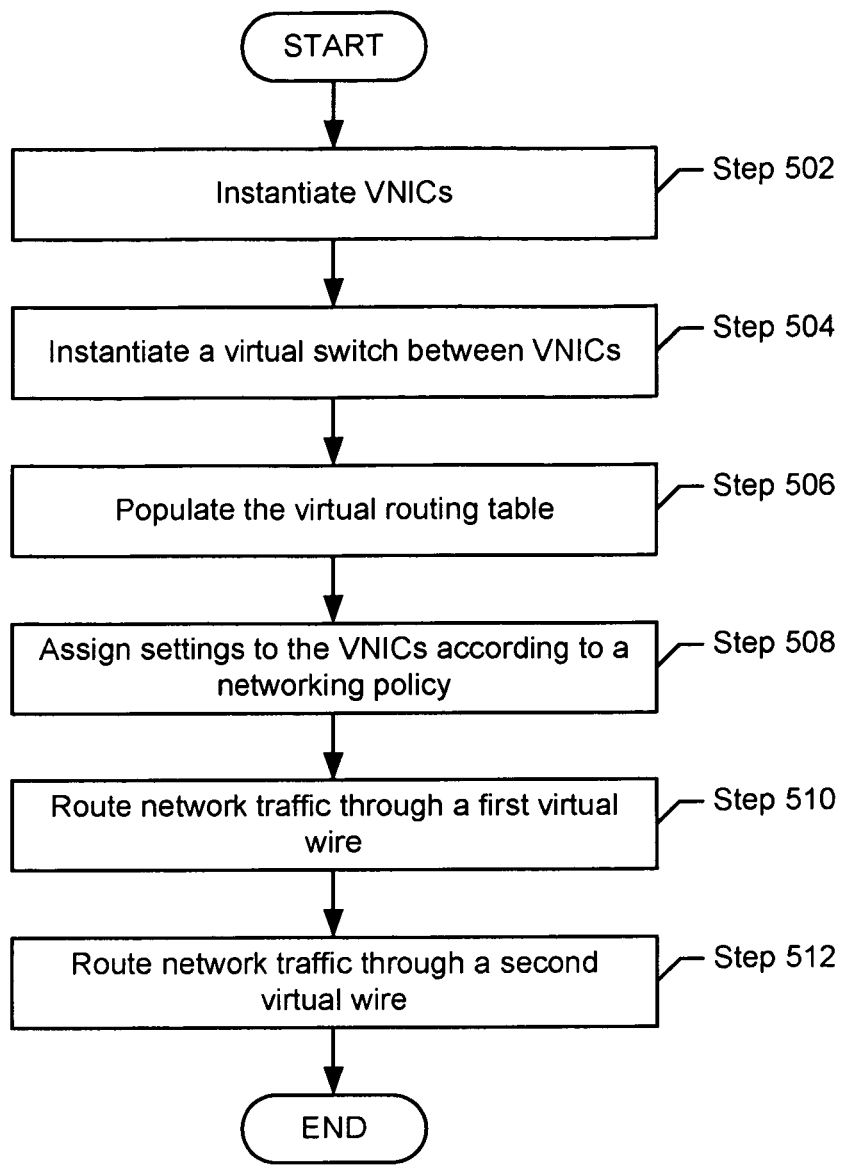
FIG. 5 shows a flowchart of a method for creating a virtual network path in accordance with one or more embodiments of the invention.

FIG. 5 shows a flowchart of a method for creating a virtual network path in accordance with one or more embodiments of the invention. In one or more embodiments of the invention, one or more of the steps shown in FIG. 5 may be omitted, repeated, and/or performed in a different order. Accordingly, embodiments of the invention should not be considered limited to the specific arrangement of steps shown in FIG. 5.

In one or more embodiments of the invention, in Step 502, VNICs are instantiated for multiple virtual machines. The virtual machines are located in blades, as discussed above. Further, the virtual machines may each be associated with one or more VNICs. In one or more embodiments of the invention, instantiating a VNIC involves loading a VNIC object in memory and registering the VNIC object with a host operating system, i.e., an operating system that is hosting the virtual machine associated with the VNIC. Registering the VNIC object establishes an interface between the host operating system's networking functionality and the abstraction layer provided by the VNIC. Thereafter, when the host operating system receives network traffic addressed to the VNIC, the host operating system forwards the network traffic to the VNIC. Instantiation of VNICs in accordance with one or more embodiments of the invention is discussed in detail in U.S. patent application Ser. No. 11/489,942, incorporated by reference above.

As discussed above, a single blade may include multiple virtual machines configured to communicate with each other. In one or more embodiments of the invention, in Step 504, a virtual switch is instantiated to facilitate communication between the virtual machines. As noted above, the virtual switch allows communication between VNICs independent of the chassis interconnect. Instantiation of virtual switches in accordance with one or more embodiments of the invention is discussed in detail in U.S. patent application Ser. No. 11/480,261, incorporated by reference above.

In one or more embodiments of the invention, in Step 506, a virtual switching table is populated. As noted above, the virtual switching table may be located in a network express manager configured to manage network traffic flowing to and from the virtual machines. Populating the virtual switching table involves associating VNIC identifiers (for example, Internet Protocol and/or Media Access Control (MAC) addresses) with VNIC locations (for example, PCI-E endpoints). In one or more embodiments of the invention, the virtual switching table is populated in response to a user command issued via a control operating system, i.e., an operating system that includes functionality to control the network express manager.

In one or more embodiments of the invention, VNICs include settings for controlling the processing of network packets. In one or more embodiments of the invention, in Step 508, settings are assigned to the VNICs according to a networking policy. Many different types of networking policies may be enforced using settings in the VNICs. For example, a setting may be used to provision a particular portion of a blade's available bandwidth to one or more VNICs. As another example, a setting may be used to restrict use of a VNIC to a particular type of network traffic, such as Voice over IP (VoIP) or Transmission Control Protocol/IP (TCP/IP). Further, settings for multiple VNICs in a virtual network path may be identical. For example, VNICs in a virtual network path may be capped at the same bandwidth limit, thereby allowing for consistent data flow across the virtual network path. In one or more embodiments of the invention, a network express manager is configured to transmit the desired settings to the VNICs.

In one or more embodiments of the invention, once the VNICs are instantiated and the virtual switching table is populated, network traffic may be transmitted from a VNIC in one blade to a VNIC in another blade. The connection between the two VNICs may be thought of as a "virtual wire," because the arrangement obviates the need for traditional network wires such as Ethernet cables. A virtual wire functions similar to a physical wire in the sense that network traffic passing through one virtual wire is isolated from network traffic passing through another virtual wire, even though the network traffic may pass through the same blade (i.e., using the same virtual machine or different virtual machines located in the blade).

Further, a combination of two or more virtual wires may be thought of as a "virtual network path." Specifically, transmitting network traffic over the virtual network path involves routing the network traffic through a first virtual wire (Step 510) and then through a second virtual wire (Step 512). For example, when receiving network traffic from a client via the physical network interface, one virtual wire may be located between the physical network interface and a VNIC, and a second virtual wire may be located between the VNIC and another VNIC.

Figure 6A:
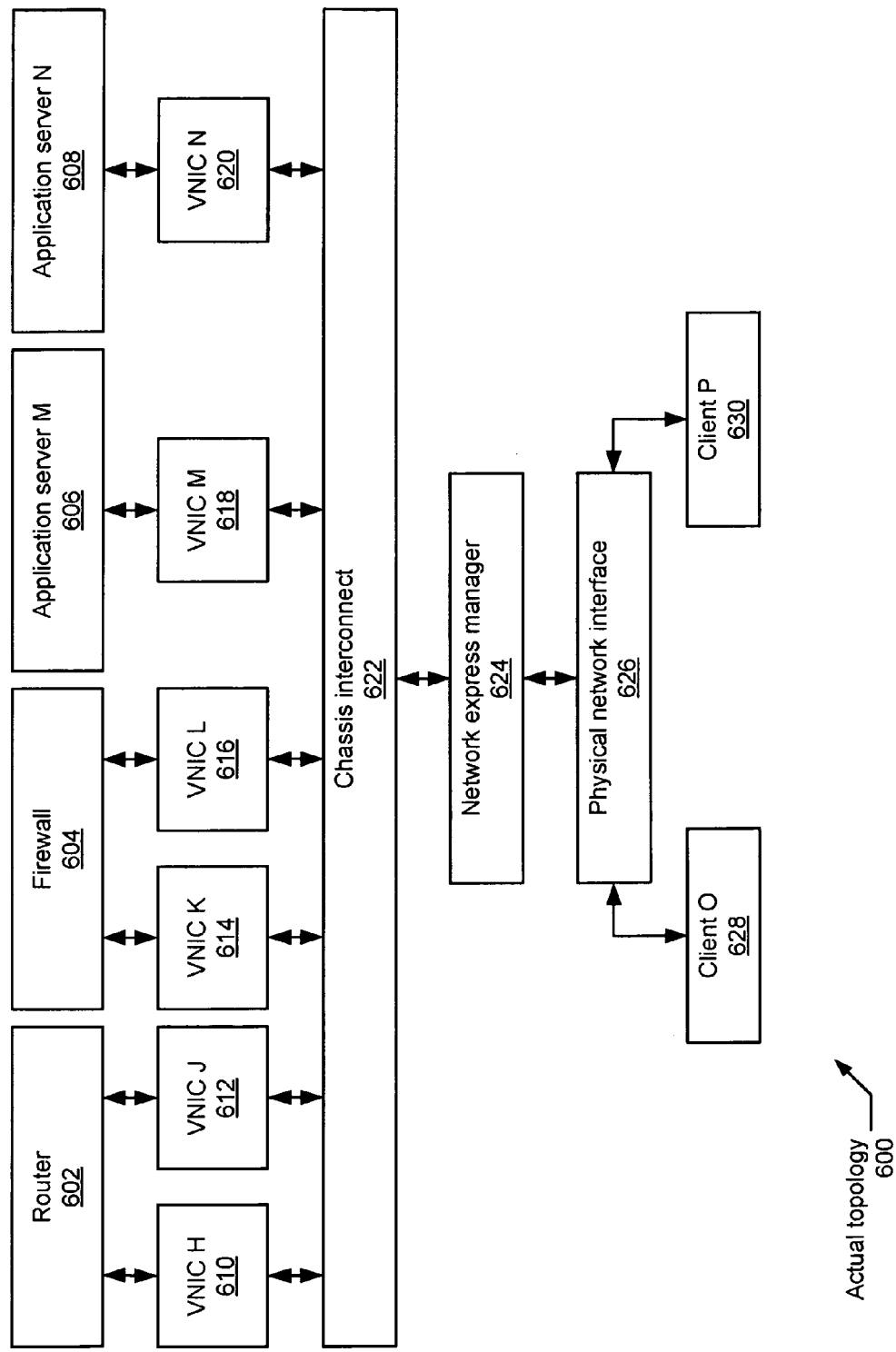
FIGS. 6A-6C show an example of creating virtual network paths in accordance with one or more embodiments of the invention.
Figure 6B:
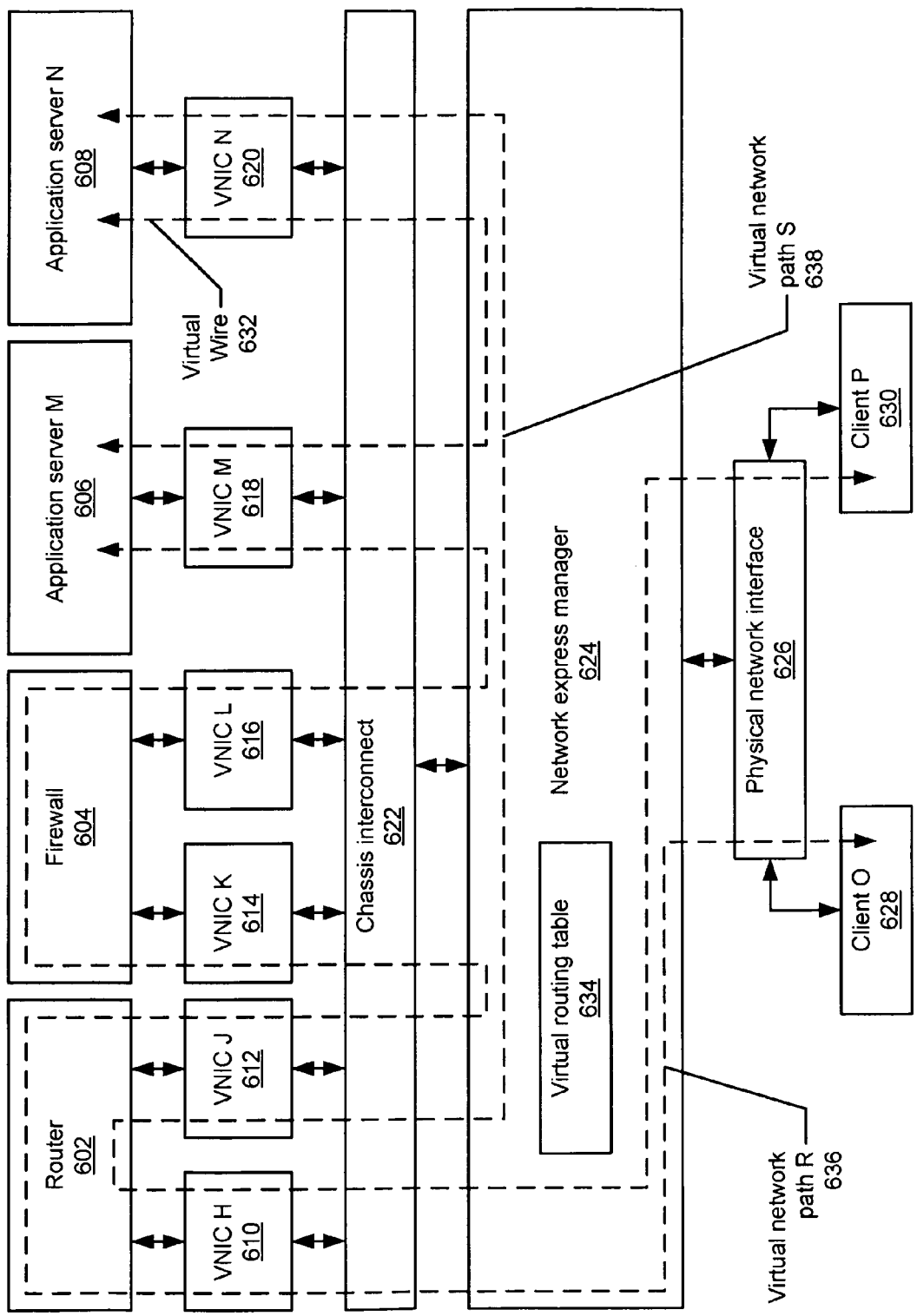
Figure 6C:
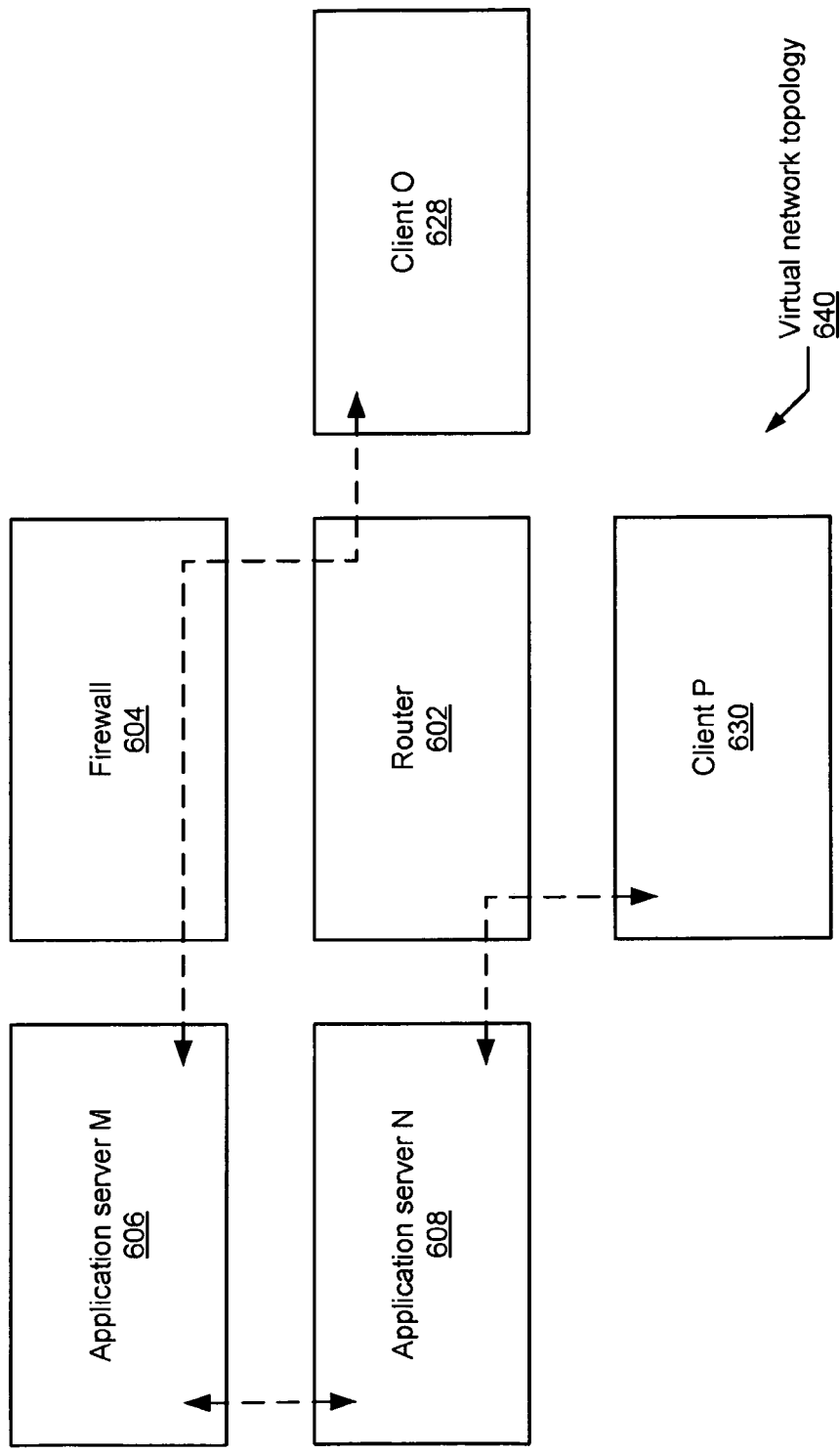

FIGS. 6A-6C show an example of creating virtual network paths in accordance with one or more embodiments of the invention. Specifically, FIG. 6A shows a diagram of an actual topology (600) in accordance with one or more embodiments of the invention, FIG. 6B shows how network traffic may be routed through the actual topology (600), and FIG. 6C shows a virtual network topology (640) created by routing network traffic as shown in FIG. 6B. FIGS. 6A-6C are provided as examples only, and should not be construed as limiting the scope of the invention.

Referring first to FIG. 6A, the actual topology (600) includes multiple virtual machines. Specifically, the actual topology (600) includes a router (602), a firewall (604), application server M (606), and application server N (608), each executing in a separate virtual machine. The virtual machines are located in blades communicatively coupled with a chassis interconnect (622), and include networking functionality provided by the blades via VNICs (i.e., VNIC H (610), VNIC J (612), VNIC K (614), VNIC M (618), and VNIC N (620)). For ease of illustration, the blades themselves are not included in the diagram.

In one or more embodiments of the invention, the router (602), the firewall (604), application server M (606), and application server N (608) are each located in separate blades. Alternatively, as noted above, a blade may include multiple virtual machines. For example, the router (602) and the firewall (604) may be located in a single blade. Further, each virtual machine may be associated with a different number of VNICs than the number of VNICs shown in FIG. 6A.

Continuing with discussion of FIG. 6A, a network express manager (624) is configured to manage network traffic flowing to and from the virtual machines. Further, the network express manager (624) is configured to manage access to a physical network interface (626) used to communicate with client O (628) and client P (630). In FIG. 6A, the virtual machines, VNICs, chassis interconnect (622), network express manager (624), and physical network interface (626) are all located within a chassis interconnect. Client O (628) and client P (630) are located in one or more networks (not shown) to which the chassis interconnect is connected.

FIG. 6B shows how network traffic may be routed through the actual topology (600) in accordance with one or more embodiments of the invention. In one or more embodiments of the invention, the routing is performed by the network express manager (624) using a virtual switching table (634).

As discussed above, network traffic routed to and from the VNICs may be though of as flowing through a "virtual wire." For example, FIG. 6B shows a virtual wire (632) located between application server M (606) and application server N (608). To use the virtual wire, application server M (606) transmits a network packet via VNIC M (618). The network packet is addressed to VNIC N (620) associated with application server N (608). The network express manager (624) receives the network packet via the chassis interconnect (622), inspects the network packet, and determines the target VNIC location using the virtual switching table (634). If the target VNIC location is not found in the virtual switching table (634), then the network packet may be dropped. In this example, the target VNIC location is the blade in which VNIC N (620) is located. The network express manager (624) routes the network packet to the target VNIC location, and application server N (608) receives the network packet via VNIC N (620), thereby completing the virtual wire (632). In one or more embodiments of the invention, the virtual wire (632) may also be used to transmit network traffic in the opposite direction, i.e., from application server N (608) to application server M (606).

Further, as discussed above, multiple virtual wires may be combined to form a "virtual network path." For example, FIG. 6B shows virtual network path R (636), which flows from client O (628), through the router (602), through the firewall (604), and terminates at application server M (606). Specifically, the virtual network path R (636) includes the following virtual wires. A virtual wire is located between the physical network interface (626) and VNIC H (610). Another virtual wire is located between VNIC J (612) and VNIC K (614). Yet another virtual wire is located between VNIC L (616) and VNIC M (618). If the router (602) and the firewall (604) are located in the same blade, then a virtual switch may be substituted for the virtual wire located between VNIC J (612) and VNIC K (614), thereby eliminating use of the chassis interconnect (622) from communications between the router (602) and the firewall (604).

Similarly, FIG. 6B shows virtual network path S (638), which flows from client P (630), through the router (602), and terminates at application server N (608). Virtual network path S (638) includes a virtual wire between the physical network interface (626) and VNIC H (610), and a virtual wire between VNIC J (612) and VNIC N (620). The differences between virtual network path R (636) and virtual network path S (638) exemplify how multiple virtual network paths may be located in the same blade chassis.

In one or more embodiments of the invention, VNIC settings are applied separately for each virtual network path. For example, different bandwidth limits may be used for virtual network path R (636) and virtual network path S (638).

Thus, the virtual network paths may be thought of as including many of the same features as traditional network paths (e.g., using Ethernet cables), even though traditional network wires are not used within the blade chassis. However, traditional network wires may still be required outside the blade chassis, for example between the physical network interface (626) and client O (628) and/or client P (630).

FIG. 6C shows a diagram of the virtual network topology (640) resulting from the use of the virtual network path R (636), virtual network path S (638), and virtual wire (632) shown in FIG. 6B. The virtual network topology (640) allows the various components of the network (i.e., router (602), firewall (604), application server M (606), application server N (608), client O (628), and client P (630)) to interact in a manner similar to a traditional wired network. However, as discussed above, communication between the components located within the blade chassis (i.e., router (602), firewall (604), application server M (606), and application server N (608)) is accomplished without the use of traditional network wires.

In one embodiment of the invention, data may be transferred between virtual machines executing on different blades in a blade chassis using Transmission Control Protocol (TCP) and Internet Protocol (IP). Further, data may also be transferred between the virtual machines using low-overhead data transfers. In particular, data may be transferred directly from physical memory on one blade to physical memory on another blade.

More specifically, the virtual machine (or application executing therein) may establish a TCP connection with another virtual machine and then, using the TCP connection, perform a zero-copy handshake. In one embodiment of the invention, the zero-copy handshake involves determining whether the virtual machines are able to communicate using low-overhead data transfer and if the virtual machines (or applications executing therein) want to transfer data using low-overhead data transfer. In one embodiment of the invention, the virtual machines may communicate using a combination of data transfer over TCP/IP and data transfer using low-overhead data transfer.

In one embodiment of the invention, low-overhead data transfer is achieved by allowing the direct transfer of data from the virtual memory associated with a sending application (executing in a first virtual machine) to the virtual memory of a receiving application (executing in a second virtual machine), where the first application is executing on a first blade and the second application is executing on a second blade. In one embodiment of the invention, the target virtual memory address for the transfer must be provided prior to the transfer of data. If the receiving application is executing in a guest operating system (executing in a virtual machine), which in turn is executing in a host operating system, then the receiving application must provide the sending application (or a related process) a physical memory address (which corresponds to the virtual memory associated with the receiving application) for a buffer to which to transfer the data. However, the receiving application is only able to provide a virtual memory address for the receiving application. This virtual memory address must be translated one or more times in order to obtain the underlying physical memory address. The process of translation is described in FIG. 7 below. Once the translation is complete, the physical memory address (as well as any other necessary information) is provided to the sending application (or a related process) to perform low-overhead data transfer as described in FIG. 8.

Figure 7:
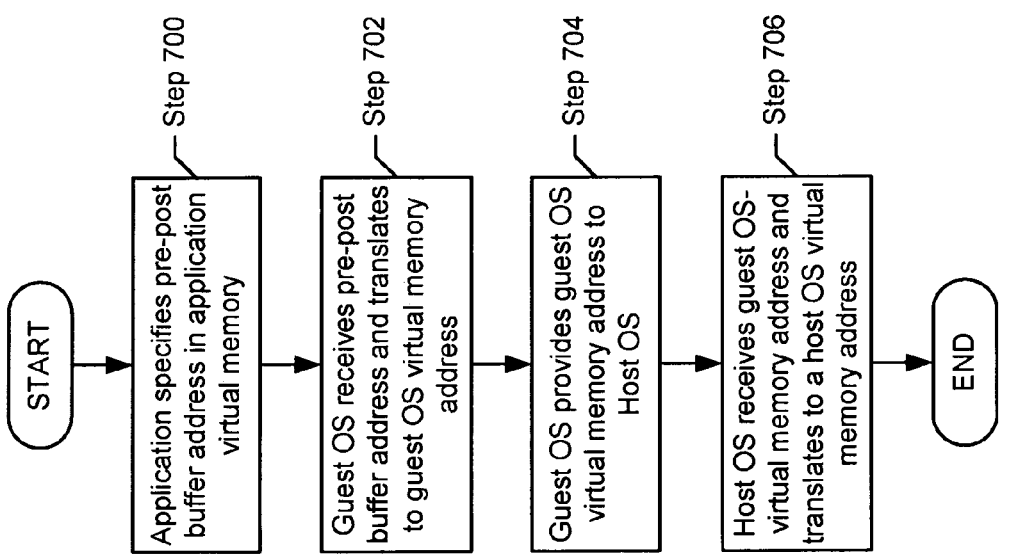
FIGS. 7-8 show flowcharts of a method for low-overhead data transfer in accordance with one or more embodiments of the invention.

FIG. 7 shows a flowchart of a method for pre-posting buffers for an application prior to the application using low-overhead data transfer. In one or more embodiments of the invention, one or more of the steps shown in FIG. 7 may be omitted, repeated, and/or performed in a different order than the order shown in FIG. 7. Accordingly, embodiments of the invention should not be considered limited to the specific arrangement of steps shown in FIG. 7.

In Step 700, an application specifies a pre-post buffer address. In one embodiment of the invention, the pre-post buffer address is a virtual memory address in virtual memory associated with the application. In one embodiment of the invention, the pre-post buffer address may refer to a buffer that is greater than 1 megabyte in size. In Step 702, the guest operating system receives and translates the pre-post buffer address into a guest OS virtual memory address. In one embodiment of the invention, the guest OS virtual memory address is a virtual memory address in a virtual memory associated with the guest operating system.

In Step 704, the guest operating system provides the guest OS virtual memory address to the host operating system. In Step 706, the host operating system receives and translates the guest OS virtual memory address into a host OS virtual memory address. Based on the host virtual memory address, the operating system may determine the underlying physical memory address corresponding to the host OS virtual memory address. The physical memory address corresponds to the host OS virtual memory address is the same physical memory address which corresponds to the pre-post buffer address.

In one embodiment of the invention, the host operating system notifies that the guest operating system that the per-post buffer address has been successfully pre-posted. The guest operating may, in turn, notify the application that the pre-post buffer address has been successfully pre-posted. In addition, the host operating system may maintain the translated physical address and any other related information (collectively referred to as "pre-post buffer information").

At this stage, the application may now participate in low-overhead data transfer. More specifically, the application may receive data using low-overhead data transfer. Those skilled in the art will appreciate the FIG. 7 may be repeated multiple times for a given application in order for the application to pre-post multiple buffers for use in low-overhead data transfer. Further, the application may also send data to another application using low-overhead data transfer if the other application also pre-posts buffers using, for example, the method shown in FIG. 7.

Figure 8:
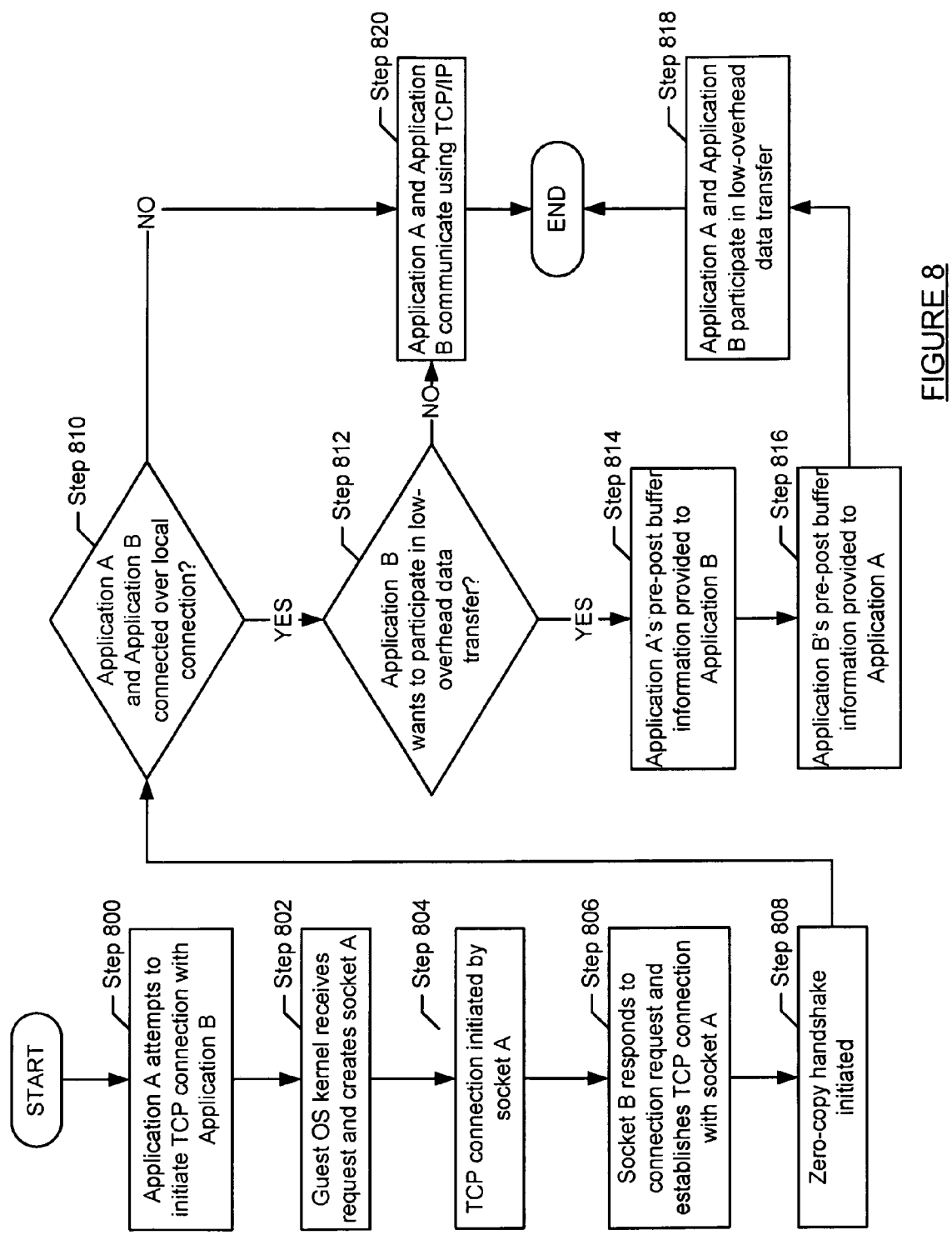

FIG. 8 shows a flowchart of a method for initiating and using low-overhead data transfer. In one or more embodiments of the invention, one or more of the steps shown in FIG. 8 may be omitted, repeated, and/or performed in a different order than the order shown in FIG. 8. Accordingly, embodiments of the invention should not be considered limited to the specific arrangement of steps shown in FIG. 8.

In Step 800, Application A attempts to initiate a TCP connection with Application B. In one embodiment of the invention, Application A provides an IP address assigned to the virtual machine (or assigned to the VNIC associated with the virtual machine) on which Application B is executing. In addition, Application A may also provide a port number.

In Step 802, the guest OS kernel, in response the request from Application A to initiate the TCP connection, creates socket A. In one embodiment of the invention, socket A is a kernel level process identified by the IP-Port Number pair and is a communication end-point configured to interface with Application A and the VNIC executing on the host operating system (on which the guest OS is executing). In Step 804, a TCP connection is initiated by socket A. In Step 806, socket B responds to the connection request and a TCP connection is established.

In Step 808, the zero-copy handshake is initiated. In one embodiment of the invention, the zero-copy handshake is an exchange of data designed to establish whether two applications may transfer data using low-overhead data transfer. In one embodiment of the invention, the zero-copy handshake is initiated when Application A sends one or more requests to Application B to determine whether Application A and Application B may transfer data using low-overhead data transfer. In one embodiment of the invention, the request may include placing a specific marker in a TCP SYN packet.

In one embodiment of the invention, instead of the applications initiating the zero-copy handshake, the VNICs executing on the respective host operating systems (see FIG. 9 below) may initiate and subsequently perform the zero-copy handshake. In such cases, one or both of the applications, prior to the initiation of the TCP connection have indicated that they are able to transfer data using low-overhead data transfer and have performed the method shown in FIG. 7 to obtain the pre-post buffer information.

In Step 810, as part of the zero-copy handshake, a determination is made about whether Application A and Application B are connected over a local TCP connection. In one embodiment of the invention, Application A and Application B are connected over a local TCP connection when both Application A and Application B are executing on blades within the same blade chassis. If Application A and Application B are connected over a local TCP connection, the process proceeds to Step 812. Alternatively, the process proceeds to Step 820. In Step 820, Applications A and B communicate using TCP/IP.

In Step 812, as part of the zero-copy handshake, a determination is made about whether Application B wants to participate in low-overhead data transfer. In one embodiment of the invention, this determination may include either of the following determinations: (i) Application B will send data to Application A using low-overhead data transfer but will only receive data from Application A via TCP/IP; and (ii) Application B will send data to Application A using low-overhead data transfer and Application B will receive data from Application A using low-overhead data transfer. If Application B wants to participate in low-overhead data transfer, then the process proceeds to Step 814. Alternatively, the process proceeds to Step 820 (i.e., Application B does not want to participate in either of the aforementioned scenarios). In one embodiment of the invention, the zero-copy handshake is performed over the TCP connection.

In Step 814, Application B is provided with Application A's pre-post buffer information. In Step 816, depending on the determination in Step 812, Application A may be provided with Application B's pre-post buffer information. In one embodiment of the invention, the information transferred in Step 814 and Step 816 are communicated over the TCP connection. In Step 818, Applications A and B participate in low-overhead data transfer.

In one or more embodiments of the invention, low-overhead data transfer from Application A to Application B uses, for example, a Direct Memory Access (DMA) operation, where the DMA operation uses as input Application B's pre-post buffer information. Those skilled in the art will appreciate that other write operations (e.g., RDMA) may be used to write data directly from one physical memory location to another physical memory on different blades.

In one embodiment of the invention, the low-overhead transfer is performed by DMA (or RDMA) engines executing in (or managed by) the respective host operating systems. Further, because the data transfer is directly from the one blade to another, the data transfer does not require the additional processing overhead associated with other transfer protocols such as TCP. Further, in one embodiment of the invention, the low-overhead data transfer may use the underlying error detection and correction functionality of the chassis interconnect to ensure that data is transferred in an uncorrupted manner.

In one embodiment of the invention, once data from Application B is transferred to Application A using the low-overhead data transfer, Application A is notified of the presence of the data. In one embodiment of the invention, Application A receives the notification from the guest operating system on which it is executing. Further, the guest operating system is notified by the host operating system on which it is executing. Finally, the host operating system is notified by Application B, the guest operating system on which Application B is executing, or the host operating system on which the aforementioned guest operating system is executing (or a process executing thereon).

In one embodiment of the invention, Application A and Application B may communicate using both TCP/IP and low-overhead data transfer. For example, TCP/IP may be used for all communication of a certain type (e.g., all files in a specific file format) and/or less than a certain size and low-overhead data transfer may be used for all communication of another type and/or greater than a certain size.

Figure 9:
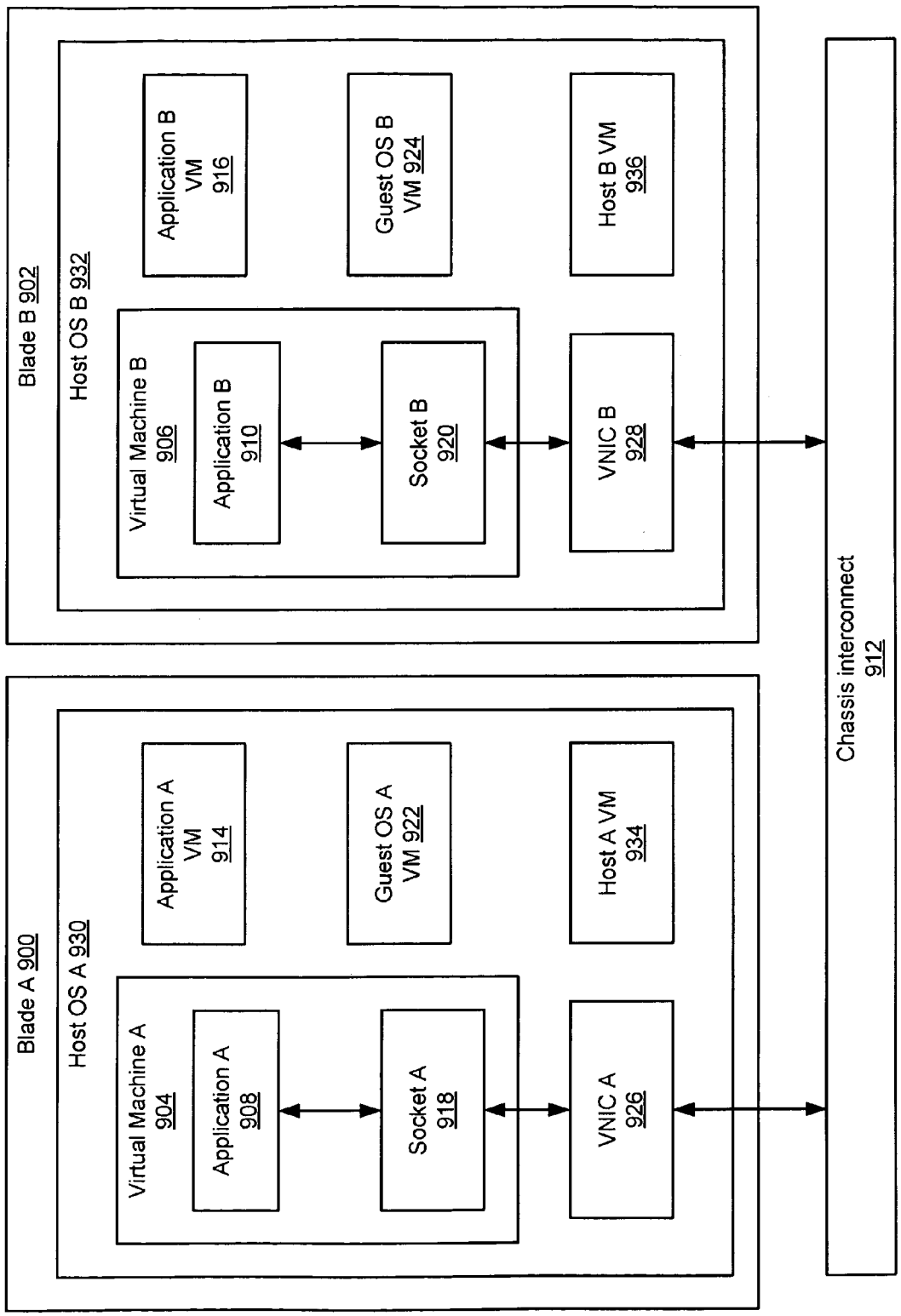
FIG. 9 shows an example of low-overhead data transfer in accordance with one or more embodiments of the invention.

FIG. 9 shows an example of low-overhead data transfer in accordance with one or more embodiments of the invention. FIG. 9 is provided for exemplary purposes only and should not be construed as limiting the scope of the invention. Referring to FIG. 9, blade A (900) and blade B (902) are each communicatively coupled with a chassis interconnect (912). Application A (908) in blade A (900) is configured to communicate with application B (910) in blade B (902) via a TCP connection having socket A (918) and socket B (920) as endpoints. Specifically, socket A (918) is configured to transfer data to socket B (902) by way of VNIC A (926), VNIC B (928), and the chassis interconnect (912). Further, application A (908) is executing in virtual machine A (904) on guest OS A (not shown) and application B (910) is executing in virtual machine B (906) on guest OS B (not shown).

Based on the above, consider the scenario in which application A (908) and application B (910) each have performed the method described in FIG. 7 to generate buffer pre-post information. More specifically, application A (908) allocated per-post buffer A (not shown) in Application A virtual memory (VM) (914). The virtual memory address associated with per-post buffer A is then translated to a guest operating system VM (922) address. The guest operating system VM (922) address is then translated by the host operating system A (930) to obtain a host VM address from the host VM (934), which corresponds to an underlying physical memory address. A similar process is performed for Application B (910) and using Application B VM (916) and translating to a guest operating system VM (924) address and finally to an underlying physical memory address which corresponds to the a host VM address in host VM (936).

Using the above pre-post buffer information, the applications may communicate as follows in accordance with one embodiment of the invention. Specifically, application A (908) is configured to request a TCP connection with application B (910) for transferring data. Socket A (918) initiates a TCP connection with socket B (920) via VNIC A (926) to VNIC B (928).

Once the TCP connection is established, the zero-copy handshake is performed. Specifically, a determination is made by VNIC A (926) that Application A (908) and Application B (910) are connected over a local TCP connection. A further determination is made that Application B (910) will send data to Application A (908) using low-overhead data transfer and Application B (910) will receive data from Application A (908) using low-overhead data transfer.

In one or more embodiments of the invention, VNIC A (926) then passes Application A's pre-post buffer information to VNIC B (928) and VNIC B (928) passes Application B's pre-post buffer information to VNIC A (926). The applications may then transfer data using low-overhead data transfer.

In one embodiment of the invention, data from application B (910) is transferred using a RDMA engine and the application A's pre-post buffer information directly to applications A's VM (914), where the RDMA engine located on blade B (902) and is managed by VNIC B (928). Prior to the transfer, VNIC A may compare the location in the physical memory received from VNIC B with an allowed address range associated with application A to determine whether the data may be transferred to the location in memory specified by the pre-post buffer information. If the location in physical memory received by VNIC A is outside the allowed address range, then the transfer may be denied.

Embodiments of the invention may be also be used to transfer data applications by using embodiments of the invention to transfer data between virtual machines (e.g., virtual machine A (904) and virtual machine B (906)). For example, referring to FIG. 9, to send data from application A (908) to application B (910). Application A (908) may transfer data over the connection to VNIC A (926). VNIC A (926) in accordance with embodiments of the invention, obtains pre-post buffer for virtual machine B (906) and subsequently transfers the data using, for example, a RDMA engine directly to the virtual Guest OS B VM (924). Upon receipt, the data is copied into application B VM (916). In such cases, the virtual machines, as opposed to the applications, are aware of the ability to transfer data using low-overhead data transfer. However, the applications are not aware of this functionality. Further, the applications, in this scenario, do not need to include functionality to pre-post buffers. Instead, the virtual machines need to include functionality to pre-post buffers.

Those skilled in the art will appreciate that while the invention has been described with respect to using blades, the invention may be extended for use with other computer systems, which are not blades. Specifically, the invention may be extended to any computer, which includes at least memory, a processor, and a mechanism to physically connect to and communicate over the chassis interconnect. Examples of such computers include, but are not limited to, multi-processor servers, network appliances, and light-weight computing devices (e.g., computers that only include memory, a processor, a mechanism to physically connect to and communicate over the chassis interconnect), and the necessary hardware to enable the aforementioned components to interact.

Further, those skilled in the art will appreciate that if one or more computers, which are not blades, are not used to implement the invention, then an appropriate chassis may be used in place of the blade chassis.

Software instructions to perform embodiments of the invention may be stored on a computer readable medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for low-overhead data transfer, comprising:
    initiating, by a first application, a Transmission Communication Protocol (TCP) connection with a second application, wherein the first application is executing on a first computer in a first virtual machine, the second application is executing on a second computer in a second virtual machine, and the first computer and the second computer are located on a chassis and communicate over a chassis interconnect, wherein the first computer is directly connected to the chassis interconnect at a first Peripheral Component Interface Express (PCI-E) end point and the second computer is directly connected to the chassis interconnect at a second PCI-E endpoint;
    establishing, in response to the initiation, the TCP connection between the first application and the second application;
    selecting, by a first Virtual Network Interface Card (VNIC), a second protocol from a group consisting of the first protocol and the second protocol based on a determination that the TCP connection between the first application and the second application is a local TCP connection, wherein the first VNIC is located on the first computer and is interposed between the first virtual machine and the chassis interconnect, wherein the TCP connection is the local TCP connection when the first application and the second application are executing on separate physical computers connected to the chassis, and wherein the first protocol is TCP and the second protocol comprises using a low-overhead data transfer;
    based on the selection of the second protocol:
        providing, by the first application, pre-post buffer information to the second application, wherein the pre-post buffer information corresponds to a location in a physical memory of the first computer and wherein the location in physical memory corresponds to a virtual memory address of the first application; and
        transferring data, by the second application, to the first application using the pre-post buffer information, wherein transferring the data comprises writing the data directly into the location in the physical memory of the first computer.

2. The method of claim 1, further comprising:
generating the pre-post information, wherein generating the pre-post information comprises:
allocating the virtual memory address in virtual memory associated with the first application;
providing the virtual memory address to a guest operating system (OS) executing the first application, wherein the guest OS is executing in the first virtual machine;
translating the virtual memory address to obtain a guest OS virtual memory address associated with the guest operating system;
providing the guest OS virtual memory address to a host operating system upon which the guest operating system is executing;
translating the virtual memory address to obtain a host OS virtual memory address associated with the host operating system, wherein the host OS virtual memory address corresponds to the location in the physical memory of the first computer.

3. The method of claim 1, wherein the pre-post information is provided to the over the TCP connection and wherein the pre-post information is provided to the first VNIC.

4. The method of claim 3, wherein the first VNIC is configured to compare the location in the physical memory received from a second VNIC with an allowed address range associated with the first application to determine whether the data may be transferred to the location in the physical memory, wherein the second VNIC is located on the second computer.

5. The method of claim 1, wherein the second application provides a second virtual network interface card (VNIC) located on the second computer with a location of physical memory associated with the TCP connection.

6. The method of claim 5, wherein transferring the data comprises:
writing, by the second VNIC, the data to the location in the physical memory of the first computer using remote direct memory access (RDMA) and the location in the physical memory of the first computer.

7. The method of claim 5, wherein the first VNIC and the second VNIC are nodes in a virtual network path, wherein the virtual network path comprises a first virtual wire between the first VNIC and the second VNIC.

8. The method of claim 1, wherein the first computer and the second computer are blades.

9. A system comprising:
a chassis interconnect; and
a first application is executing on a first computer in a first virtual machine and a second application is executing on a second computer in a second virtual machine, wherein the first computer and the second computer are located on a chassis and communicate over the chassis interconnect,
wherein the first computer is directly connected to the chassis interconnect at a first Peripheral Component Interface Express (PCI-E) end point and the second computer is directly connected to the chassis interconnect at a second PCI-E endpoint,
wherein the first application is configured to initiate a Transmission Communication Protocol (TCP) connection with the second application,
wherein, in response to the initiation, the TCP connection is established between the first application and the second application,
wherein a first virtual network interface card, executing on the first computer and interposed between the first virtual machine and the chassis interconnect, is configured to select a second protocol from a group consisting of the first protocol and the second protocol based on a determination that the TCP connection between the first application and the second application is a local TCP connection, wherein the TCP connection is the local TCP connection when the first application and the second application are executing on separate physical computers connected to the chassis, and wherein the first protocol is TCP and the second protocol comprises using a low-overhead data transfer,
based on the selection of the second protocol, the first application is configured to provide pre-post buffer information to the second application after the first application is determined to be executing on the same chassis as the second application,
wherein the pre-post buffer information corresponds to a location in a physical memory of the first computer and wherein the location in physical memory corresponds to a virtual memory address of the first application, and
wherein the second application transfers data to the first application using the pre-post buffer information, wherein transferring the data comprises writing the data directly into the location in the physical memory of the first computer.

10. The system of claim 9, wherein the pre-post information is generated by:
allocating the virtual memory address in virtual memory associated with the first application;
providing the virtual memory address to a guest operating system (OS) executing the first application, wherein the guest OS is executing in the first virtual machine;
translating the virtual memory address to obtain a guest OS virtual memory address associated with the guest operating system;
providing the guest OS virtual memory address to a host operating system upon which the guest operating system is executing;
translating the virtual memory address to obtain a host OS virtual memory address associated with the host operating system, wherein the host OS virtual memory address corresponds to the location in the physical memory of the first computer.

11. The system of claim 9, wherein the pre-post information is provided to the over the TCP connection.

12. The system of claim 9, wherein the second application provides a second VNIC located on the second computer with a location of physical memory associated with the TCP connection.

13. The system of claim 12, wherein transferring the data comprises:
writing, by the second VNIC, the data to the location in the physical memory of the first computer using remote direct memory access (RDMA) and the location in the physical memory of the first computer.

14. The system of claim 12, wherein second virtual machine is configured to directly transfer data from the first virtual machine to a location in the physical memory of the first computer, wherein the second VNIC transfers the data using a remote direct memory access (RDMA) engine.

15. The system of claim 9, wherein the first computer and the second computer are blades.

16. A non-transitory computer readable medium comprising a plurality of executable instructions for low-overhead data transfer, wherein the plurality of executable instructions comprises instructions to:

initiate, by a first application, a Transmission Communication Protocol (TCP) connection with a second application, wherein the first application is executing on a first computer in a first virtual machine, the second application is executing on a second computer in a second virtual machine, and the first computer and the second computer are located on a chassis and communicate over a chassis interconnect, wherein the first computer is directly connected to the chassis interconnect at a first Peripheral Component Interface Express (PCI-E) end point and the second computer is directly connected to the chassis interconnect at a second PCI-E endpoint;

establish, in response to the initiation, the TCP connection between the first application and the second application;

select, by a first Virtual Network Interface Card (VNIC), a second protocol from a group consisting of the first protocol and the second protocol based on a determination that the TCP connection between the first application and the second application is a local TCP connection, wherein the first VNIC is located on the first computer and is interposed between the first virtual machine and the chassis interconnect, wherein the TCP connection is the local TCP connection when the first application and the second application are executing on separate physical computers connected to the chassis, and wherein the first protocol is TCP and the second protocol comprises using a low-overhead data transfer;

based on the selection of the second protocol:

provide, by the first application, pre-post buffer information to the second application, wherein the pre-post buffer information corresponds to a location in a physical memory of the first computer and wherein the location in physical memory corresponds to a virtual memory address of the first application; and transfer data, by the second application, to the first application using the pre-post buffer information, wherein transferring the data comprises writing the data directly into the location in the physical memory of the first computer.

17. The non-transitory computer readable medium of claim 16, wherein the plurality of executable instructions further comprises instructions to:

generate the pre-post information, wherein generating the pre-post information comprises:

allocating the virtual memory address in virtual memory associated with the first application;

providing the virtual memory address to a guest operating system (OS) executing the first application, wherein the guest OS is executing in the first virtual machine;

translating the virtual memory address to obtain a guest OS virtual memory address associated with the guest operating system;

providing the guest OS virtual memory address to a host operating system upon which the guest operating system is executing;

translating the virtual memory address to obtain a host OS virtual memory address associated with the host operating system, wherein the host OS virtual memory address corresponds to the location in the physical memory of the first computer.

18. The non-transitory computer readable medium of claim 16, wherein the TCP connection is established between the first VNIC located on the first computer and a second VNIC located on the second computer, wherein the first computer and the second computer are blades.

19. The non-transitory computer readable medium of claim 18, writing, by the second VNIC, the data to the location in the physical memory of the first computer using a remote direct memory access (RDMA) engine.

* * * * *